Figure 3:
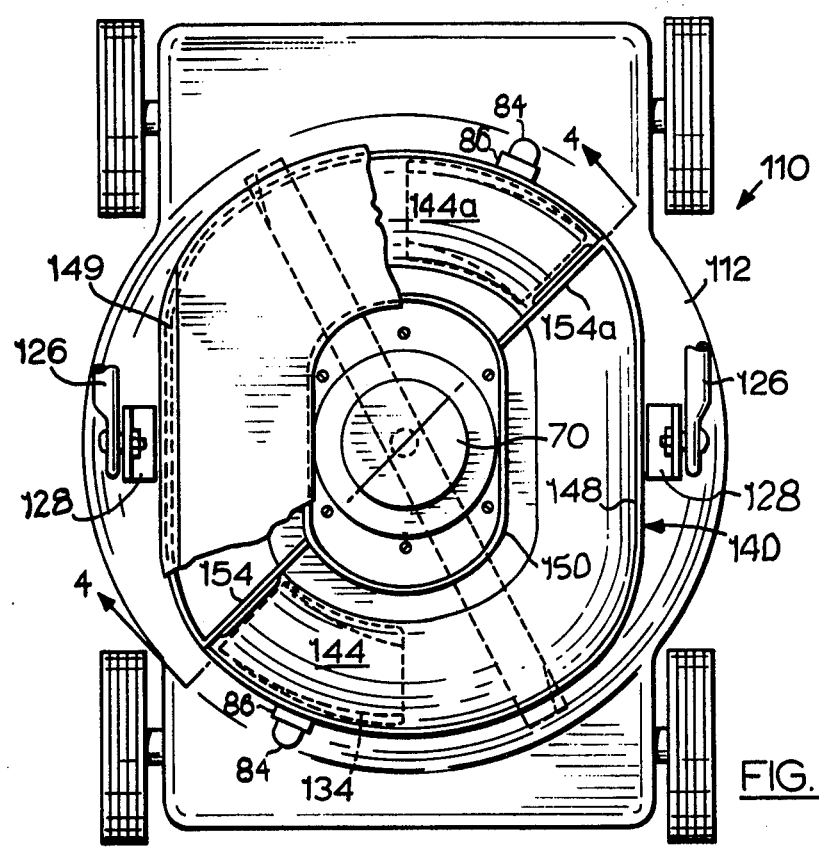

United States Patent [19]

Szymanis

[11] 4,087,955
[45] May 9, 1978

[54] ROTARY LAWN MOWER WITH IMPROVED GRASS COLLECTOR

[75] Inventor: Edward Szymanis, Midhurst, Canada

[73] Assignee: Canadian General Electric Company Limited, Toronto, Canada

[21] Appl. No.: 714,975

[22] Filed: Aug. 16, 1976

[30] Foreign Application Priority Data

Aug. 21, 1975  Canada .................................. 234103

[51] Int. Cl.² ...................... A01D 35/22; A01D 53/06
[52] U.S. Cl. ......................................... 56/202; 56/13.4
[58] Field of Search ....................... 56/202, 13.3, 13.4, 56/10.5

[56] References Cited

U.S. PATENT DOCUMENTS

| | | | |
|---|---|---|---|
| 2,779,146 | 1/1957 | Mitchell et al. | 56/13.4 |
| 2,957,295 | 10/1960 | Brown | 56/13.4 |
| 2,990,666 | 7/1961 | Blume | 56/13.4 |
| 3,186,152 | 6/1965 | Epstein | 56/202 |
| 3,191,370 | 6/1965 | Epstein | 56/202 |
| 3,628,315 | 12/1971 | Bartholomew | 56/10.5 |
| 3,949,540 | 4/1976 | Christopherson et al. | 56/202 |

FOREIGN PATENT DOCUMENTS 1,240,277  7/1971  United Kingdom .................. 56/13.4

Primary Examiner—Russell R. Kinsey
Attorney, Agent, or Firm—Raymond A. Eckersley

[57] ABSTRACT

A grass collector for a rotary lawn mower may be moulded in thermoplastic and comprises a base wall, a pair of concentric annular walls upstanding therefrom. A grass inlet is located in the base between the annular walls, and a baffle wall to the rear of the inlet. Grass clippings entering the collector are directed by the walls in an annular flow path and are collected in the annular space between the walls. The collector overlays the deck of the mower and is contained substantially within the wheel base thereof, contributing to increased stability. Safety interlock means for a mower employing the collector are also disclosed.

14 Claims, 5 Drawing Figures

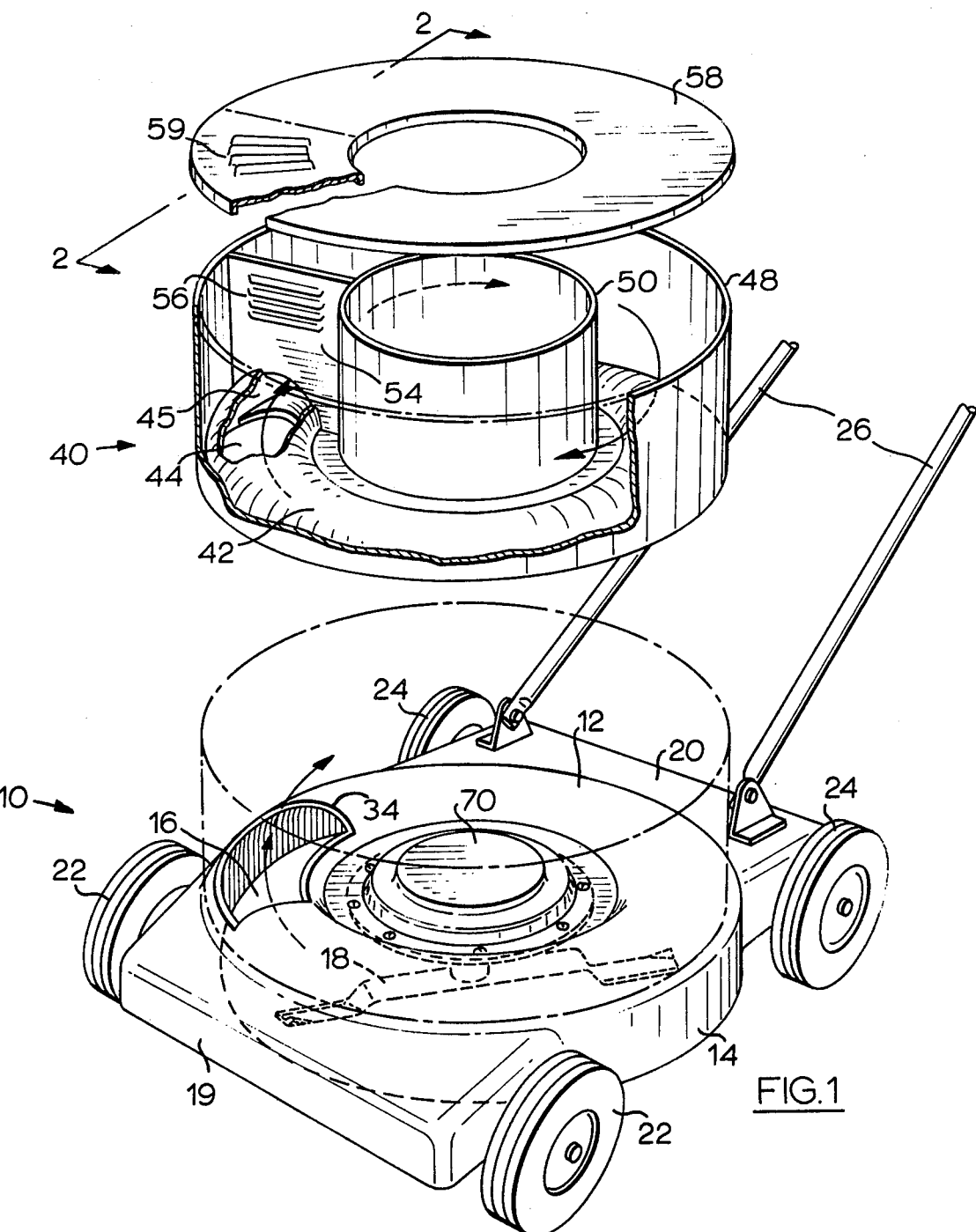
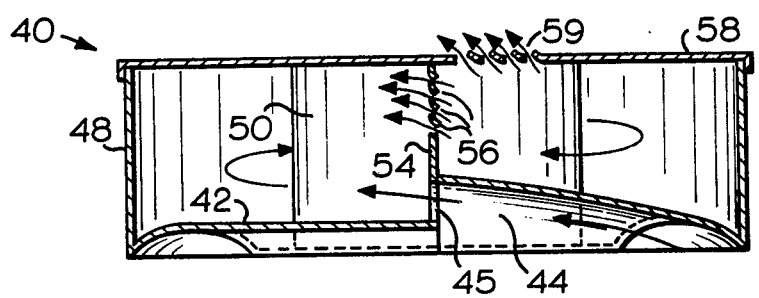

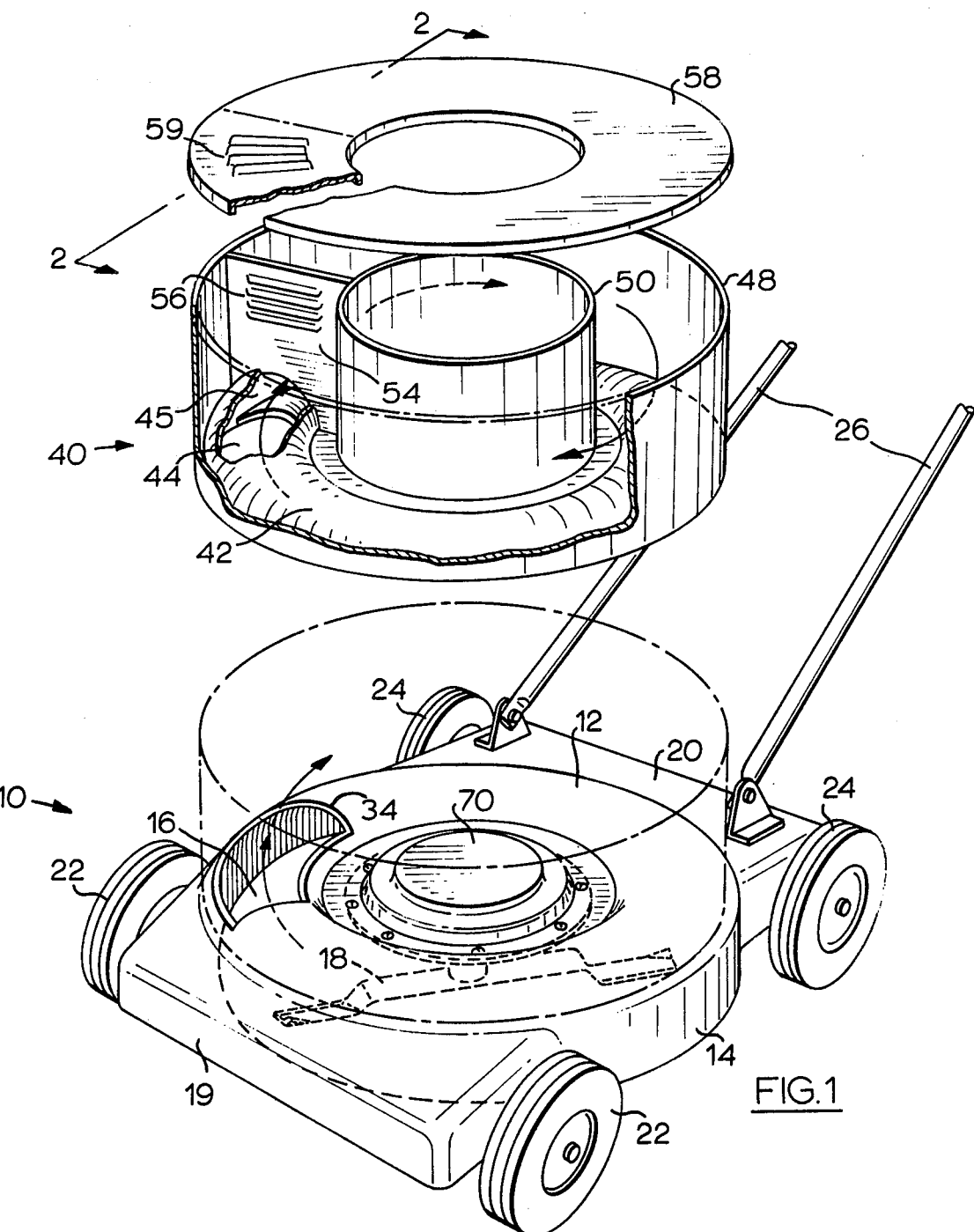
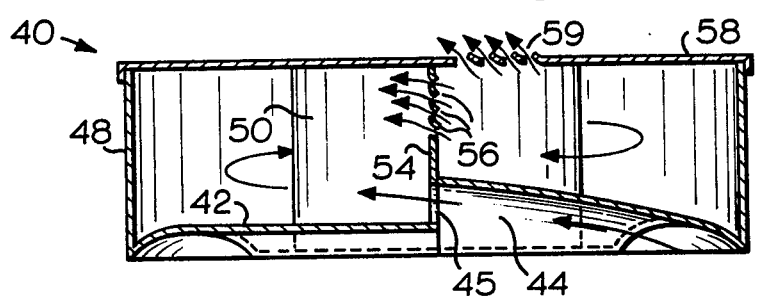

ROTARY LAWN MOWER WITH IMPROVED GRASS COLLECTOR

This invention relates to power lawn mowers of the rotary type. It most concerns improvements in the collection of grass cuttings with concomitant improvements in safety and in the ease of handling of the lawn mower.

A rotary lawn mower in its most rudimentary form comprises a deck including a cutting chamber within which one or more cutting blades is mounted for rotation in a generally horizontal plane. Grass cut by the blade is normally ejected from the mower through one or more chute exits in the deck which usually give direct access to the cutting chamber. Feet or other body members that may be introduced via the chute into the cutting orbit of the blade are subject to severe accidental injury. Additionally, stones or other similar objects struck by the blade may be ejected via the chute at high velocities to cause injury or damage.

These dangers may be nullified to a large extent by the attachment of a grass collector to the chute exit. The chute exit of a mower is normally formed as a volute passage to direct the air flow and grass cuttings carried thereby in a preferred flow path. In known grass collectors of the bag type, some attempt has been made at controlling the air flow within the bag in order to give a preferential deposition of cuttings away from the mouth of the bag. Known expedients include increasing the cross sectional area of the bag and the pore size of the foraminaceous material from which the bag is constructed, both in a direction away from the mouth of the bag. In practise blockage of the bag frequently occurs in the vicinity of the mouth, particularly when the grass cuttings are large and heavy. The grass bags usually have minimal provision for influencing the direction of flow of air within them, and they are usually linear extensions of the chute exit. As such they usually project considerably outside the wheel base of the lawn mower, in some instances 2-3 feet. Where the bag has a rigid frame work making it self-supporting, the frame can become a lever whereby the deck may be caused to pivot upwardly and expose the cutting blade. When the grass bag is full, the centre of gravity of the mower may be shifted to such an extent that the mower becomes unstable. Additionally, no effective method has yet been devised for the attachment of grass bags to twin chute mowers wherein the chutes are positioned on opposite sides or ends of the mower.

My invention contemplates a rotary lawn mower having a grass collector wherein wall surfaces of the grass collector directs the air flow and grass cuttings carried therewith in an arcuate flow path. In its most simple form, the grass catcher comprises a base wall adapted to be mounted on the deck of a lawn mower and lay substantially within the wheel base thereof. Walls are upstanding from the base and include an outer wall and connected thereto by a baffle wall. At least the base, outer wall and inner wall are constructed to an opening in the deck of the lawn mower for the transference of grass cuttings; preferably the openings are interconnected by a volute passage which directs air and grass cuttings upwardly into the grass collector. The grass collector includes a lid means which encloses the space between the outer and inner walls.

Figure 4:
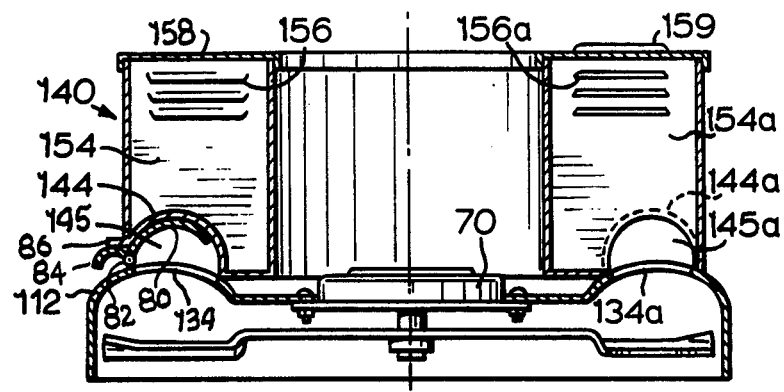

My invention will be further described with reference to an embodiment thereof as illustrated in the accompanying drawings, which show in FIG. 1, a perspective view of a single chute rotary lawn mower having a novel grass collector of this invention superposed thereabove;

in FIG. 2, a section through the grass collector of FIG. 1 taken along line 2—2 of that figure;

in FIG. 3, a plan view of a twin chute rotary lawn mower having a grass collector of this invention positioned therein;

in FIG. 4, a section through the lawn mower-grass collector of FIG. 3 taken along the line 4—4 of that figure;

in FIG. 5, a schematic circuit of a safety switching arrangement for use with electric rotary lawn mower-grass collector of this invention.

Referring to FIG. 1, a rotary lawn mower which is indicated generally by the numeral 10, comprises a deck 12 having a skirt portion 14 downwardly dependent therefrom, the deck and skirt together forming a cutting chamber 16. Deck 12 projects fore and aft of cutting chamber 16 in apron portions 19 and 20. Wheel pairs 22 and 24 are mounted on aprons 19 and 20 to support cutting chamber 16 for longitudinal travel over a ground surface. A handle 26 is mounted on apron 20, and inclines towards the rear end of the mower 10. Within cutting chamber 16 is mounted a cutting blade 18 for rotation about a generally vertical axis. An opening 34 is provided in deck 12 through which opening grass cuttings may be exhausted. Taken relative to the transverse axis of lawn mower 10, and in the forward direction of rotation of cutting blade 18, deck opening 34 normally occupies an angular interval of about 130° to 180° relative to a transverse plane extending through the blade axis of rotation.

One embodiment of a novel grass collector of my invention is shown in FIGS. 1 and 2 wherein it is generally indicated by the numeral 40. It comprises a base wall 42 adapted to overlay deck 12 and having an entry port 44 therein which communicates with deck opening 34. Upstanding from base 42 is an outer annular wall 48, an inner wall 50 which is spaced from the outer wall, and a baffle wall 54 which interconnects the outer and inner walls. A lid 58 is provided to enclose the annular space between the upstanding walls of grass collector 40. Grass collector 40 is proportioned so that it sits on deck 12 and is substantially within the wheel base of wheels 22 and 24. In practice the outer annular wall of grass collector 40 may have approximately the same planform as skirt 14, and no more of the grass collector will project beyond the wheel base than does cutting chamber 16.

Considering the operation of grass collector 40, grass cuttings from cutting chamber 16 are impelled upwardly by a current of air swept by cutting blade 18 to exit from deck openings 34 and pass to entry port 44. Entry port 44 forms a passage means wherein air and grass cuttings are directed in an upwardly inclined motion; in radial cross section entry port 44 has an inverted U shape which increases in height in the direction of access opening 45 formed at the end thereof. Desirably the width also of the passage increases, and most desirably the passage will be volute as illustrated. It will be apparent that deck opening 34 could be formed equally well to include an air directing passage means.

In prior art devices wherein an air and grass mixture enters a collection bag, the bag is usually constructed of wardly from shutter 80; arm 84 is engaged by a shoulder 86 situated adjacent the lower extremity of outer annular wall 49 of grass collector 40 whereby arm 84 is depressed by the weight of the grass collector, thus raising shutter 80. Desirably shutter 80 will have a cross section complementary to that of entry port 44.

An electrical interlock of a type suitable for use when the prime motive source for blade 18 is an electric motor is shown schematically in FIG. 5. The interlock circuit comprises four switches, shown as Sw 1–SW 4. Switch 1 is a normally open microswitch operated by placement of grass catcher 40 to be switched to the ON position. Switches 2 and 3 are different operating circuits of a toggle switch 72 or the like, having 3 positions OFF, ON, momentary ON. Switch 4 is a latching relay switch, normally open, operated by a solenoid 74. Assuming grass catcher 40 to be positioned and Sw 1 closed, the toggle switch 72 is actuated by the mower operator to engage the momentary contact position wherein Sw 2 is closed, thereby connecting solenoid 74 to a current source 71 and closing Sw 4. Upon releasing toggle switch 72 to the ON position, current is fed to the windings of a motor 70 or any other safety deactivating mechanism such as a clutch, for example. When grass catcher 40 is removed, Sw 1 reverts to the open position thereby stopping motor 70 and deactivating solenoid 74 so that Sw 4 reverts to its normally open position. Upon replacement of the grass catcher, motor 70 will not be energized until toggle switch 72 is activated by the operator, thus precluding motor 70 from being started unwittingly by placement of grass catcher 40. Motor 70 may be switched off in the normal manner by placement of toggle switch 72 to the OFF position. Other more or less complex circuitry for effecting a similar interlock will be apparent to those skilled in the art.

What I claim as new and desire to secure by Letters Patent of the United States is:

1. In a lawn mower including means for collecting grass cuttings, said lawn mower having a deck including a skirt downwardly dependent therefrom to enclose a cutting chamber, an electric motor mounted on said deck, vertical drive shaft means drivingly interconnected with said motor, a cutting blade mounted on said drive shaft for rotary movement in said chamber, said deck having an opening therein for the egress of grass cuttings from said mower, said mower including wheel means located adjacent four corners of said deck to support said deck for movement across a ground surface, the improvement wherein said means for collecting grass cuttings comprises a grass collector mounted on said deck to lay substantially within the wheel base of said wheel means, said grass collector having a base, walls upstanding from said base including an outer annular wall, an annular inner wall spaced from said outer wall said inner wall forming a conduit for the passage of cooling air to said motor and a baffle wall interconnecting said outer and inner walls, at least said outer, inner walls and said base being constructed from an air directing material, said collector having an opening in the base thereof adapted to be connected to said deck opening and lid means enclosing the space between said inner and outer walls.

2. A lawn mower as defined in claim 1 wherein said grass collecting means includes a volute passage means to direct air and grass cuttings entering said grass collector in an upwardly inclined direction.

3. A lawn mower as defined in claim 2 wherein said passage means is formed in the base of said collector.

4. A lawn mower as defined in claim 2 wherein said passage means has an inverted U shaped radial cross section which increases in height towards an entry port formed in said grass collector.

5. A lawn mower as defined in claim 1 wherein entry to said grass collector is via a port located in the base thereof between said annular walls.

6. A lawn mower as defined in claim 5 wherein said baffle wall is located proximate to the rear of said entry port.

7. A lawn mower as defined in claim 6 wherein means is provided to exhaust air from said collector preferentially from a zone immediately behind said entry port.

8. A lawn mower as defined in claim 7 wherein said exhaust means includes louvres formed in said lid in said zone.

9. A lawn mower as defined in claim 1 wherein said grass collector is divided into two compartments, each compartment having an entry port and baffle wall, a baffle wall of a one compartment being located proximate to the rear of an adjacent entry port.

10. A lawn mower as defined in claim 9 wherein said outer wall is generally oval in plan form.

11. A lawn mower as defined in claim 1 wherein said annular walls are concentric.

12. A lawn mower as defined in claim 1 wherein shutter means is provided to close said deck opening when said collector is not in place.

13. A lawn mower as defined in claim 1 wherein said rotary blade is propelled by an electric motor, and wherein electrical interlock means are provided to inactivate said motor when said collector is not in place.

14. A lawn mower as defined in claim 13 wherein said interlock means includes manual switching means which must be engaged before said motor is rendered operative.

* * * * *